United States Patent [19]

Kritzler

[11] 4,338,376
[45] Jul. 6, 1982

[54] HIGH FLUOROCARBON CONTENT COATING COMPOSITION, METHOD OF APPLICATION, AND COATED ARTICLE

[75] Inventor: Steven Kritzler, Cronulla, Australia

[73] Assignee: Otis Elevator Company, Farmington, Conn.

[21] Appl. No.: 198,315

[22] Filed: Oct. 20, 1980

[30] Foreign Application Priority Data

Oct. 26, 1979 [AU] Australia .............................. PE1089

[51] Int. Cl.$^3$ ......................... B32B 17/10; B05D 3/02
[52] U.S. Cl. ...................................... 428/417; 252/54;
252/58; 427/386; 427/387; 427/388.2;
427/389.7; 428/413; 428/418; 428/422;
525/101; 524/188; 524/361; 524/462
[58] Field of Search .............. 252/54, 58; 260/32.8 A,
260/18 N, 32.8 B, 32.8 EP, 18 PN, 18 S, 33.8
EP, 33.6 EP; 427/386, 387, 388.2, 389.7, 42 L;
428/421, 413, 422, 418, 417; 525/121, 342, 101

[56] References Cited

U.S. PATENT DOCUMENTS

| | | | |
|---|---|---|---|
| 3,111,426 | 11/1963 | Capron | 525/121 X |
| 3,144,118 | 8/1964 | Fabula | 198/16 |
| 3,661,831 | 5/1972 | Fang | 260/32.8 |
| 3,766,133 | 10/1973 | Roberts et al. | 260/41 R |
| 3,793,287 | 2/1974 | Fitz et al. | 260/41 A |
| 3,850,867 | 11/1974 | Hartmann | 260/29.6 F |
| 3,853,690 | 12/1974 | McGarry | 161/189 |
| 3,872,045 | 3/1975 | Field et al. | 260/31.2 R |
| 3,879,302 | 4/1975 | Reick | 252/58 X |
| 3,899,563 | 8/1975 | Oxenrider et al. | 264/211 |
| 3,900,594 | 8/1975 | Guthrie et al. | 427/53 |
| 3,929,721 | 12/1975 | Leverett | 260/42.15 |
| 3,940,360 | 2/1976 | Carder | 260/29.15 B |
| 3,970,627 | 7/1976 | Seymus | 260/29.6 F |
| 3,986,993 | 10/1976 | Vassiliou | 260/23 XA |
| 3,988,287 | 10/1976 | Inokuchi et al. | 260/37 N |
| 4,036,906 | 7/1977 | Finelli | 260/830 P |
| 4,073,762 | 2/1978 | Hosoda et al. | 260/29.3 |

FOREIGN PATENT DOCUMENTS 490993 of 0000 Australia .
2141879 3/1973 Fed. Rep. of Germany ...... 525/342

OTHER PUBLICATIONS

Australian Published Specification No. 15565/76 "Method for Improving the Lubricating Properties of Solid Lubricants".

*Primary Examiner*—Michael R. Lusignan
*Assistant Examiner*—Thurman K. Page
*Attorney, Agent, or Firm*—Harry J. Gwinnell

[57] ABSTRACT

A coating composition displaying an extremely low coefficient of friction particularly with respect to rubber-type materials and with high abrasion resistance and excellent adhesion to a wide variety of substrates, including metal and glass is provided. The composition contains a high fluorocarbon polymer content, (e.g., polytetrafluoroethylene), a silane wetting agent, a thermosetting resin (e.g. epoxy), and optionally a crosslinking agent and is easy to apply.

15 Claims, No Drawings

HIGH FLUOROCARBON CONTENT COATING COMPOSITION, METHOD OF APPLICATION, AND COATED ARTICLE

DESCRIPTION

1. Technical Field

The field of art to which this invention pertains is coatings, and particularly lubricious, polymerized unsaturated compound containing coating compositions, additionally containing a thermosetting component such as an epoxy.

2. Background Art

While lubricious fluorocarbon polymers such as polytetrafluoroethylene have many properties which make them exceptional material where antistick and slip properties are desired, these same properties make such material difficult to use. For example, because of these superior antistick properties, it is difficult to adhere the material to any other material to which it is desired to impart such properties. U.S. Pat. No. 3,144,118 while extolling the virtues of Teflon ® (Dupont de Nemours & Co., Inc.) as an antistick material, demonstrates the difficulty in the use of such material, for example, unmodified requiring heating to 700° F. Furthermore, Teflon coatings generally suffer in their abrasion resistance. This is underscored for example by U.S. Pat. No. 3,850,867 which speaks of such difficulties. Among the attempts which have been made to overcome the problems associated with the use of Teflon in compositions are such things as the inclusion of thermosetting material with the Teflon (note U.S. Pat. Nos. 3,144,118 and 3,853,690) and the inclusion of such things as fillers and wetting agents (U.S. Pat. No. 3,850,867). But, there is still a need for a composition with a combination of high lubricity, especially high lubricity toward rubber-type materials coming in contact with such compositions coated on a substrate, good adherence to a variety of substrates, abrasion resistance and high fluorocarbon polymer content without its attendant disadvantages.

DISCLOSURE OF INVENTION

The present invention is directed to a coating composition which is high in lubricity, high in abrasion resistance, has good adherence and yet has ease of application to a variety of substrates. The composition comprises essentially three parts: (1) a lubricious fluorocarbon polymer such as polytetrafluoroethylene, (2) a thermosetting resin such as an epoxy resin, and (3) a wetting agent such as a silane.

Another aspect of the invention includes relatively simple methods of application of the composition to substrates including roller, brush or spray application with room temperature or external heat drying.

Another aspect of the invention includes articles with improved lubricious properties coated with the composition of the present invention, such as glass and metal.

BEST MODE FOR CARRYING OUT THE INVENTION

The material of the present invention has utility in any area where a high abrasion resistant, highly lubricious material is desirable. And while the material has particular utility in a coating application because of its exceptional adhesion to various substrates such as metal and glass, it can also be used as a molded material where abrasion resistance and high slip properties in a molded form are desired, for example, in sheet or strip form, in laminate form, or laminated to a surface.

If the material is to be used in a coating process, the material is very adaptable to being applied by any method such as roller, brush or spraying, but is particularly adapted to application by spray to give an attractive smooth-looking coating. It also has particular utility in such uses as on skirt panels of moving stairways because of its high adhesion, high slip, and high abrasion resistance properties. For example, note U.S. Pat. No. 3,144,118.

The composition of the present invention comprises essentially three components. The first component which is most important for imparting the lubricative properties to the coating is a fluorocarbon polymer or copolymer. While polytetrafluoroethylene is the most preferred fluorinated polymer because of its well known highly lubricious properties, other lubricious fluorocarbon polymers or copolymers may be used, for example, chloro-fluoro-type polymers or fluorocarbon copolymers such as ethylene propylene-fluoroethylenes. The fluorocarbon polymer selected is a solid, desirably in finely powdered form. The second essential component is a settable resin which may be a thermosetting resin or a curable resin. For preference the resin is selected having regard to properties such as ease of application to a substrate, ease of setting or cure, and the desired abrasion resistance and adhesion characteristics of the cured composition. Selection of an epoxy resin is preferred, for example, Epotuff 54–105 available from A. C. Hatrick Chemicals Pty., Ltd. as a 74 to 76% solids by weight epoxy composition in a xylol solvent, having a viscosity of $Z_3$ to $Z_6$ and an epoxide equivalent of from 600 to 700.

When an epoxy resin is used then a cross-linking agent, preferably an amine cross-linking agent such as a fatty polyamide amine cross-linking agent, is desirably employed in conjunction with the resin for curing, e.g. in a ratio of from 1.5:1 to 2.0:1 by weight of epoxy resin and preferably in a ratio of 1.7:1 to 1.8:1. An example of a suitable fatty polyamide amine cross-linking agent is Versamid 54–405 available from A. C. Hatrick Chemicals Pty., Ltd. Versamid 54–405 is a fatty polyamide amine present as a 69 to 71% by weight solids composition in a xylol carrier. It has a viscosity of V–Z and an amine value of 161 to 173. When this cross-linking agent is used with Epotuff 54–105 in a composition according to the invention, high abrasion resistance and good adherence to glass and to metal substrates is obtained. However, other settable epoxy resins may be used in combination with other cross-linking agents or in their absence depending on the resin selected.

The third component of the composition which is considered essential for obtaining the improved results of the present invention is a silane wetting agent which contributes to wetting of the fluorocarbon polymer by the resin. For this purpose, it has been found that amino silanes, and more preferably di-amino-silanes, are particularly suitable. Silane 6020 available from Dow Corning and comprising an N-beta-amino-ethyl-gamma-amino-propyl-trimethoxy silane is especially preferred as the wetting agent and enables the fluorocarbons to be wetted by the resin and in some cases, bonded to the resin, contributing to both the superior adhesion and superior abrasion resistant properties of the present composition.

The silane is employed in an amount sufficient to achieve wetting of the fluorocarbon polymer by the resin and therefore, the amount used varies with the relative quantity of the polymer and resin component. Typically however, the quantity of silane is up to about 1.5% and generally varies from 0.1% to 1% by weight of total weight of solids in the composition and more typically from 0.3 to 0.7%.

The proportion of fluorocarbon polymer to resin in the composition may be as high as 4:1, but is preferably kept below 1.2:1 by weight. At higher ratios of fluorocarbon polymer to resin, it is more difficult to achieve satisfactory wetting between the polymer and the resin component. Much lower ratios of fluorocarbon polymer to resin may be employed if desired, but the lubricity of the composition decreases as the ratio of fluorocarbon polymer to resin is lowered. For example, ratios of 1.8:1 to 2.2:1 are quite satisfactory.

The composition may optionally include one or more solvents such as methyl isobutyl ketone, methyl ethyl ketone, Freon ® (Dupont de Nemours & Co., Inc.) and xylene to facilitate the dispersion of the essential components one in another or for the purpose of facilitating application to a substrate. Such solvents can comprise up to 60% by weight of the composition, for example, and preferably comprise 40% to 60% by weight. Furthermore, when a resin is employed in conjunction with a curing agent then the fluorocarbon polymer may advantageously be mixed with the curable resin component in one solvent or mixture of solvents, and the curing agent in a second solvent or mixture of solvents, the two parts being combined immediately prior to application of the composition to a substrate on which the composition is to be coated. In this case, the silane can conveniently be predissolved in a third solvent or mixture of solvents and can be combined with the other two parts also immediately prior to coating of the substrate.

Other ingredients may also optionally be added to the composition of the invention. For example, coloring agents such as carbon black or other pigments or dyes, dispersing agent, and depending on the resin employed, accelerators for speeding cure and the like.

EXAMPLE 1

A coating composition was prepared in three parts according to the following formulation.

| | Parts by weight |
| --- | --- |
| PART A | |
| Carbon Black | 3.5 |
| Polytetrafluoroethylene Powder (Fluon L169A) | 40.0 |
| Versamid 54-405 | 36.2 |
| Methyl Isobutyl Ketone | 8.0 |
| Methyl Ethyl Ketone | 10.3 |
| Freon 13 | 4.0 |
| PART B | |
| Epotuff 54-105 Epoxy Resin | 42.0 |
| Methyl Isobutyl Ketone | 5.0 |
| Methyl Ethyl Ketone | 4.0 |
| PART C | |
| Silane 6020 | 5.0 |
| Xylol | 5.2 |

Fluon L169A is available from ICI and is a 5 micron polytetrafluoroethylene powder.

Part A was manufactured in the manner of a paint and filtered through a 125 micron filter bag.

Part B was prepared as a simple mixture.

Part C was mixed under a gas blanket to exclude moisture and the silane preferably taken from fresh, dry stock.

In all cases moisture free grades were employed.

The parts were mixed thoroughly in the ratio of A:B:C of 2:1:0.2 by weight.

The order of mixing and the ratio of mixing is not critical but preferably mixing is continued for a period such as 5 minutes to ensure dispersion.

A substantial drop in viscosity occurs on addition of part C to part A indicative of wetting of the polytetrafluoroethylene by the silane.

The composition may be diluted for example with methyl isobutyl ketone to adjust viscosity to facilitate application to substrates by spraying.

EXAMPLE 2

A second embodiment according to the invention was prepared according to the following formulation.

| | Parts by weight |
| --- | --- |
| PART A | |
| Epotuff 54-105 Epoxy Resin | 6.930 |
| Methyl Isobutyl Ketone | 2.145 |
| Methyl Ethyl Ketone | 2.950 |
| Butanol | 0.250 |
| Nousperse | 0.050 |
| Carbon Black | 0.275 |
| Polytetrafluoroethylene Powder (Fluon L169A) | 5.500 |
| PART B | |
| Versamid 54-405 | 4.0 |
| Methyl Ethyl Ketone | 1.0 |
| PART C | |
| Silane 6020 | 0.165 |
| Accelerator HY960 | 0.480 |
| Xylene | 0.175 |

The parts were combined in the ratio A:B:C 23.437:5:0.82 by weight. Nousperse is an alkyd and lecithin based wetting agent obtainable from A. C. Hatrick Chemicals Pty., Ltd. Accelerator HY960 is a tri-dimethyl amino methyl phenyl catalyst hardener for epoxy resins obtainable from CIBA-GEIGY.

EXAMPLE 3

Panels of stainless steel were coated with the composition of Example 1 to a dry film thickness of 0.002 inch. The panels were prepared according to ASTM-D 609-52 (otherwise than in respect of the substrate since SAE 1010 specifies steel panels). The following test results were obtained

1. ELONGATION OF COATING WITH CONICAL MANDREL TESTER

ASTM D522-41

The coating passed on ⅜" mandrel (Elongation 6%)

2. EFFECT OF COMMON CHEMICALS ON THE COATING

ASTM D1308-57

Testing was done over two hours using both the covered and uncovered methods.

| | |
| --- | --- |
| (a) 50% ethyl alcohol | NO MARKING |
| (b) Vinegar (3% acetic Acid) | NO MARKING |
| (c) Detergent (20% Nonionic) | NO MARKING |
| (d) Lighter Fluid | NO MARKING |
| (e) Piece of cut fruit (orange) | NO MARKING |
| (f) Oils and Fats (Safflower, Butter) | NO MARKING |
| (g) Condiments (Mustard, Tomato Sauce) | NO MARKING |
| (h) Beverages (Tea, Coffee, Coca Cola) | NO MARKING |

-continued

| (j) Lubricating Grease | NO MARKING |

3. WATER IMMERSION TEST
ASTM D870-54

Total testing time was 168 hours with regular visual checks. The coating passed with no visible blistering, wrinkling or film disintegration. It was noted that no loss of adhesion or color change occurred. The coefficient of friction was retested after immersion, and no change was noted.

4. KNOOP INDENTATION HARDNESS
ASTM D 1474-57T

Knoop hardness —28

5. TABOR ABRASOR ABRASION TEST

Less than 1% loss per 1000 cycles at 500 gm

Less than 5% variation on results when the test was repeated wet.

6. SNATCH TEST—PEEL ADHESION TEST
DEF 1044 —B

Pass

7. ADHESION GRID TEST

Pass—Class 1.

8. IMPACT RESISTANCE (DROPS G.E.) FALLING BALL METHOD

Mean result 560

9. COEFFICIENT OF FRICTION—INSTRON TESTER

Test at 25 psi at 5" per min.
(a) Against Steel—0.106
(b) Against Aluminum—0.150
(c) Against Hardwood—0.098

At higher speeds the coefficient of friction decreases marginally.

EXAMPLE 4

The compositions of Example 1 and Example 2 were applied to the metal skirt panels of a moving stairway after such panels were thoroughly cleaned with a toluol solvent. In this particular example, the compositions were applied as produced by spraying to a dry film thickness of about 0.002 inch. The coated skirts dried to a slippery, tough, adherent film in about six hours at normal room temperature. The drying time could be accelerated through the use of an external heater such as a blow drier. Attempts to force a rubber-shoe material, such as a sneaker, between the moving steps and the coated skirt panel were unsuccessful due to the highly lubricious character of the coating.

It can be seen that the composition of the present invention has utility in many situations where a dry lubricious coating having high abrasion resistance is desired. Preferred embodiments have exceptional adhesion to various substrates such as metal and glass and can also be used as a molding material when abrasion resistance and high slip properties in a molded form are desired for example, in sheet or strip form, in laminate form or as a surface lamination.

If the material is to be used in a coating process, the material is easily adapted for application by any method such as roller, brush or spraying, but is particularly adapted to application by spray to give an attractive smooth looking coating. Compositions according to the invention have particular utility in uses such as on skirt panels of moving stairways because of their high adhesions, high slip and abrasion resistant properties.

Although this invention has been shown and described with respect to detailed embodiments thereof, it will be understood by those skilled in the art that various changes in form and detail thereof may be made without departing from the spirit and scope of the claimed invention.

I claim:

1. A lubricious coating composition characterized by a polytetrafluoroethylene fluorocarbon polymer component, an epoxy thermosetting resin component, an amine cross-linking agent, and a silane wetting agent, based on weight percent, the fluorocarbon:epoxy resin ratio is up to about 4:1, the amine cross-linking agent:epoxy resin ratio is up to about 2:1, and the silane wetting agent is present in an amount up to about 1.5% by weight based on total weight of solids in the composition, the composition having a low coefficient of friction with high abrasion resistance and adhesion when applied to a substrate.

2. The coating composition of claim 1 wherein the silane wetting agent is n-beta-amino-gamma-amino-propyl-trimethoxy silane, the epoxy has an epoxide equivalent of 600 to 700, and the amine cross-linking agent is a fatty polyamide amine with an amine value of 161 to 173.

3. The coating composition of claim 1 including a solvent comprising methylisobutyl ketone, methylethyl ketone, Freon 13, xylol, or mixtures thereof.

4. The composition of claim 3 wherein the solvent comprises up to about 60% by weight of the composition.

5. A method of rendering a substrate lubricious comprising applying to a substrate and drying a composition characterized by a polytetrafluoroethylene fluorocarbon polymer component, an epoxy thermosetting resin component, an amine cross-linking agent, and a silane wetting agent, based on weight percent, the fluorocarbon:epoxy resin ratio is up to about 4:1, the amine cross-linking agent:epoxy resin ratio is up to about 2:1, and the silane wetting agent is present in an amount up to about 1.5% by weight based on total weight of solids in the composition, the composition having a low coefficient of friction with high abrasion resistance and adhesion when applied to the substrate.

6. The method of claim 2 wherein the silane wetting agent is n-beta-amino-gamma-amino-propyl-trimethoxy silane, the epoxy has an epoxide equivalent of 600 to 700, and the amine cross-linking agent is a fatty polyamide amine with an amine value of 161 to 173.

7. The method of claim 2 wherein the composition includes a solvent comprising methylisobutyl ketone, methylethyl ketone, Freon 13, xylol, or mixtures thereof.

8. The method of claim 7 wherein the solvent comprises up to about 60% by weight of the composition.

9. The method of claim 2 wherein the coating has a final thickness of about 0.002 in. (0.005 cm).

10. The method of claim 2 wherein the composition is applied by spraying.

11. The method of claim 2 wherein the substrate is metal or glass.

12. A composite article comprising a substrate having a lubricious surface layer characterized by a polytetrafluoroethylene fluorocarbon polymer component, an epoxy thermosetting resin component, an amine cross-linking agent, and a silane wetting agent, based on weight percent, the fluorocarbon:epoxy resin ratio is up to about 2:1, and the silane wetting agent is present is an amount up to about 1.5% by weight based on total weight of solids in the composition, the composition having a low coefficient of friction with high abrasion resistance and adhesion when applied to the substrate.

13. The article of claim 12 wherein the silane wetting agent is n-beta-amino-gamma-amino-propyl-trimethoxy silane, the epoxy has an epoxide of 600 to 700, and the amine cross-linking agent is a fatty acid polyamide amine with an amine value of 161 to 173.

14. The article of claim 12 wherein the coating has a final thickness of about 0.002 in. (0.005 cm).

15. The article of claim 12 wherein the substrate is metal or glass.

* * * * *

UNITED STATES PATENT AND TRADEMARK OFFICE
CERTIFICATE OF CORRECTION

PATENT NO. : 4,338,376
DATED : July 6, 1982
INVENTOR(S) : Steven Kritzler

It is certified that error appears in the above-identified patent and that said Letters Patent is hereby corrected as shown below:

Claim 2, lines 2 and 3, "n-beta-amino-gamma-amino-propyl-trimethoxy silane" should read --N-beta-amino-ethyl-gamma-amino-propyl-trimethoxy silane--.

Claim 6, line 1, "Claim 2" should read --Claim 5--.

Claim 6, lines 2 and 3 "n-beta-amino-gamma-amino-propyl-trimethoxy silane" should read --N-beta-amino-ethyl-gamma-amino-propyl-trimethoxy silane--.

Claim 7, line 1, "Claim 2" should read --Claim 5--.

Claim 9, line 1, "Claim 2" should read --Claim 5--.

Claim 10, line 1, "Claim 2" should read --Claim 5--.

Claim 11, line 1, "Claim 2" should read --Claim 5--.

Claim 13, lines 2 and 3, "n-beta-amino-gamma-amino-propyl-trimethoxy silane" should read --N-beta-amino-ethyl-gamma-amino-propyl-trimethoxy silane--.

Signed and Sealed this

Fifteenth Day of November 198.

[SEAL]

Attest:

Attesting Officer

GERALD J. MOSSINGHOFF

Commissioner of Patents and Trademarks